Nov. 3, 1931. S. RYBÁR 1,829,876

EÖTVÖS'S TORSION BALANCE

Filed March 20, 1926  2 Sheets-Sheet 1

Inventor:
Stephen Rybár
By [signature]
Atty.

Patented Nov. 3, 1931

1,829,876

UNITED STATES PATENT OFFICE

STEPHEN RYBÁR, OF BUDAPEST, HUNGARY

EÖTVÖS'S TORSION BALANCE

Application filed March 20, 1926, Serial No. 96,360, and in Hungary March 23, 1925.

My invention relates to Eötvös's torsion balance and has for its object to enable the dimensions of the balance and more especially its height to be considerably reduced without the sensitiveness of the balance being thereby lessened to any extent whatever.

The torsion-balance according to my invention is diagrammatically shown in the accompanying drawings in two different embodiments.

Figure 1:
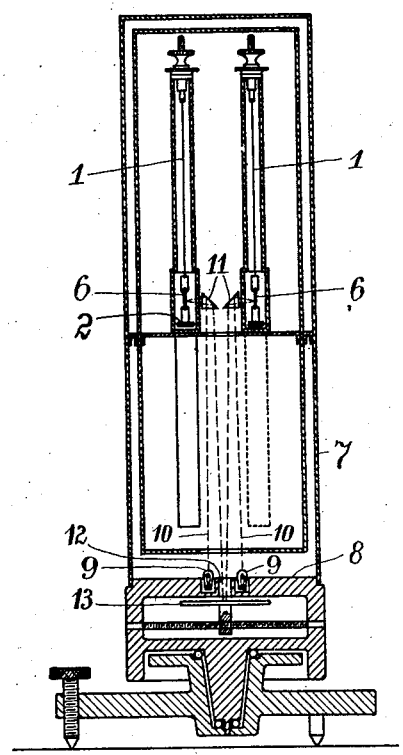
Figure 2:
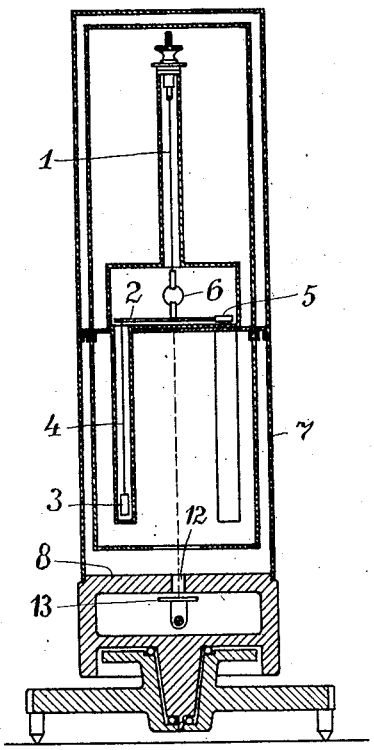
Figure 3:
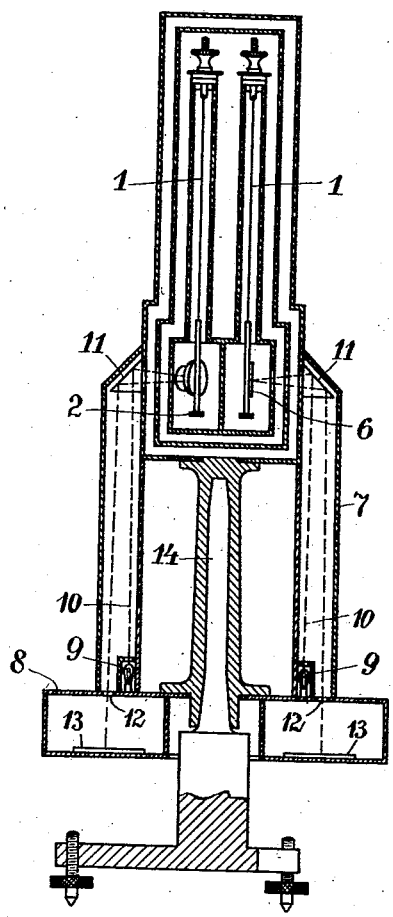
Figure 4:
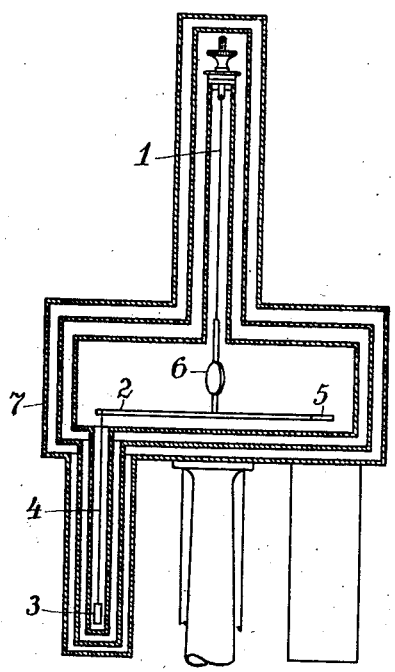

Figs. 1 and 2 are vertical sectional views of one embodiment taken in two planes at right angles, while Figs. 3 and 4 are similar views of a modification.

From the measuring wires 1 are suspended the pendulum-arms 2, from which are suspended the weights 3 by means of filaments 4. The other weights 5 are fastened to the end of the pendulum-arms 2 and there are also arranged in connection with the latter mirrors 6.

The sources of light, for example incandescent lamps 9, which produce the light signals that constitute the result of the measurement are arranged at the bottom 8 of the casing 7 of the instrument and the light rays 10 are directed to the prisms 11 arranged opposite the mirrors 6 and from the reflecting surface of these prisms on to the mirrors 6. The light rays reflected by the mirrors 6 enter the prisms 11, wherefrom they are projected again in the downward direction toward the bottom 8 and through the opening 12 provided therein they are thrown on to a photographic plate placed on a supporting plate 13 on which the rays produce, in a well-known manner light signals which are afterwards fixed.

In the manufacture of an Eötvös torsion-balance the latest efforts are being directed towards producing a balance of small dimensions. This end may be best accomplished by a reduction of the length of the measuring wires 1. If, however, the length of the measuring wires 1 is reduced from approximately 56 centimeters which is the length hitherto used to about 15 centimeters, and the hitherto usual arrangement of the register plates, at the upper part of the instrument is preserved there will not remain sufficient room for the light rays, while with the construction above described sufficient room remains between the mirrors 6 and the registering apparatus even when the instrument is of small height to allow the light rays to be sufficiently long for attaining the desired sensitiveness.

Since the light rays from the light sources striking the mirrors 6 have a constant direction and only those rays reflected by the mirrors 6 on to the registering apparatus are deflected because of the swinging of the mirrors, it is evident that the location of the light sources is of no importance from the invention's point of view so that these light sources may be arranged in any convenient manner, for instance sideways or above, in which case the rays of the light sources will have to be projected on to the mirrors 6 through a suitable arrangement of prisms.

From the invention's point of view, it is only essential that the registering apparatus or the sensitive plate receiving the light signals, should be arranged under the pendulum because this space may always be formed in such a manner as to permit the registering rays to have the required length.

In arranging the sensitive plate I do not restrict myself to the bottom of the casing of the instrument since I may arrange the plate still deeper.

While in the embodiment shown in Figs. 1 and 2 the light sources are the two vertical planes passing through the two pendulums and thus the prisms 11 lie between those pendulums in the modification shown in Figs. 3 and 4, the light sources and the prisms are arranged outside the two pendulums, in which case, of course, two separate supporting plates 13 will be required for holding the photographical plates. This latter arrangement has the advantage as compared with the former that in the center part of the instrument a well proportioned journal of rotation or standard 14 may be arranged which enables the casing of the instrument to be accurately journalled.

I claim:

In an Eötvös torsion balance, the combination of a measuring wire with a pendulum-arm suspended from said wire, a filament fixed to one end of said pendulum-arm, a weight suspended from said filament, a weight fixed to the other end of said pendulum-arm, a mirror connected to the pendulum-arm, a prism adapted to cooperate with said mirror, a light source for throwing light rays on to said prism and said mirror, and a support for a photographic plate below said pendulum-arm for receiving light rays projected by said mirror through said prism, the light source and recording apparatus being arranged outside the plane passing through the pendulum-arm.

In testimony whereof I have hereunto affixed my signature.

Dr. STEPHEN RYBÁR.